United States Patent [19]
Rangabe

[11] 4,211,422
[45] Jul. 8, 1980

[54] DAMPING APPARATUS FOR DAMPING THE RESONANCE OF DISC RECORD TONE ARMS

[75] Inventor: Alexander R. Rangabe, Portsmouth, England

[73] Assignee: Zerostat Components Limited, Huntingdon, England

[21] Appl. No.: 906,865

[22] Filed: May 17, 1978

[30] Foreign Application Priority Data

Jun. 1, 1977 [GB] United Kingdom ............... 23258/77
Jan. 11, 1978 [GB] United Kingdom ................. 1097/77

[51] Int. Cl.² ............................................... G11B 3/10
[52] U.S. Cl. ................................................ 274/23 R
[58] Field of Search ..................... 274/23 R, 23 A, 15

[56] References Cited
U.S. PATENT DOCUMENTS

| | | | |
|---|---|---|---|
| 3,301,565 | 1/1967 | Bachman | 274/23 R |
| 4,082,292 | 4/1978 | Fletchie et al. | 274/23 R |
| 4,131,284 | 12/1978 | Rangabe | 274/23 R |
| 4,151,998 | 5/1979 | Kurtin et al. | 274/23 R |

*Primary Examiner*—Charles E. Phillips
*Attorney, Agent, or Firm*—Browdy and Neimark

[57] ABSTRACT

A damping apparatus for damping the resonance of a disc record tone arm, comprises first and second relatively movable members in engagement with energy absorbing material therebetween. One of these elements has mounted thereon a skid assembly in which a cantilever arm is anchored to the element. The cantilever arm has substantial stiffness both longitudinally and in the plane normal to the record surface and also has substantial compliance transversely to its longitudinal dimension and torsional compliance. A skid pad is mounted at the free end of the cantilever arm, which skid pad has substantial stiffness in the direction tangential to the record trace.

11 Claims, 7 Drawing Figures

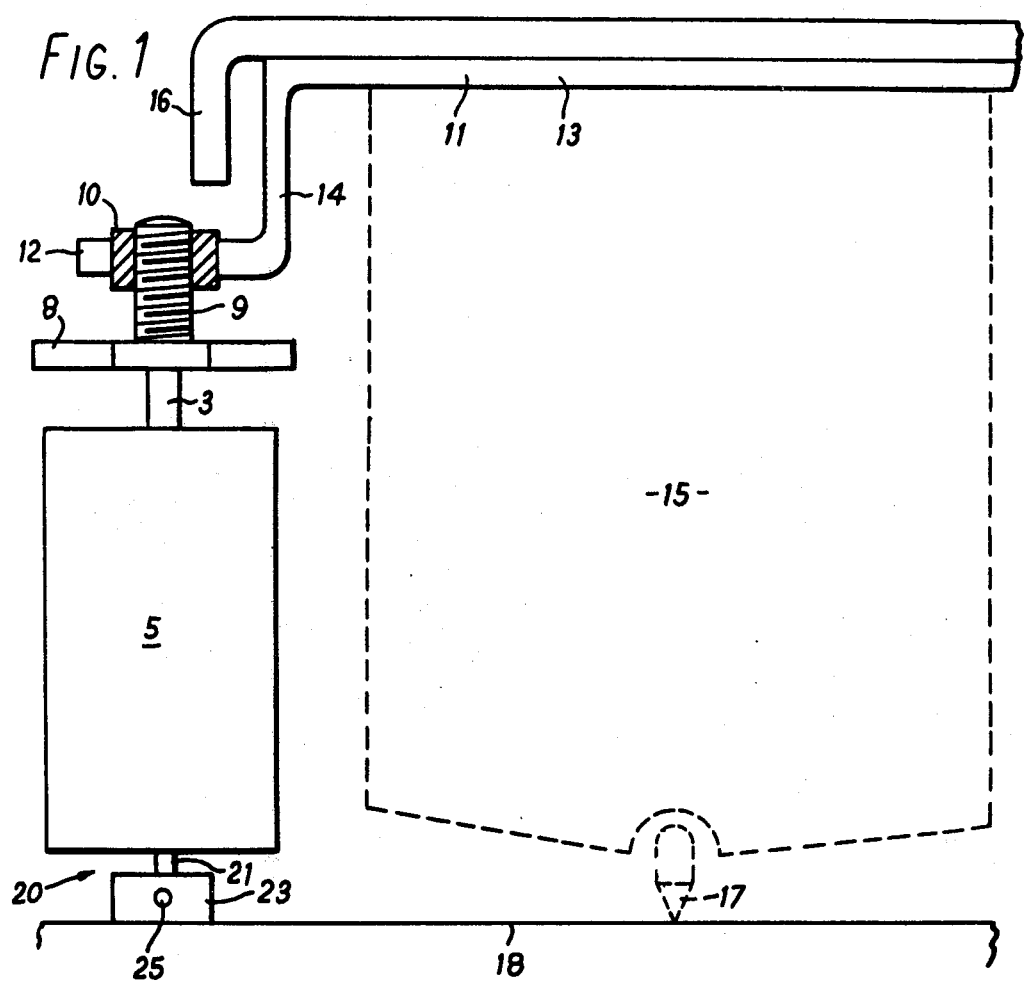

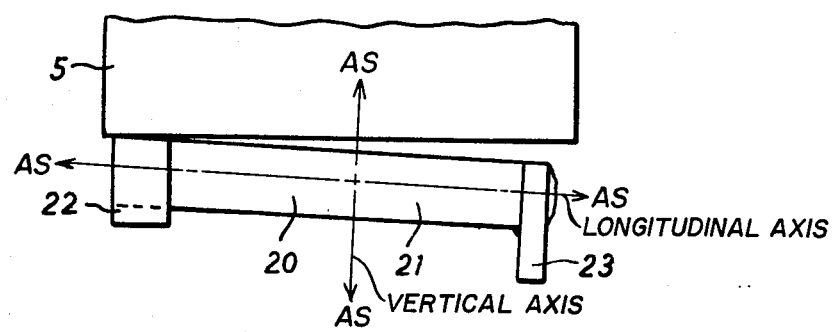
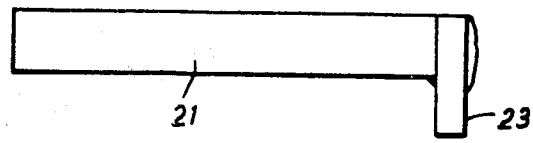
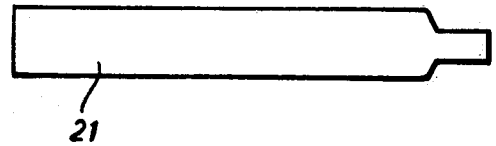
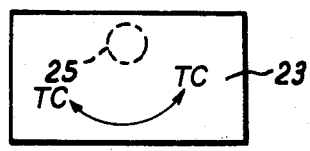
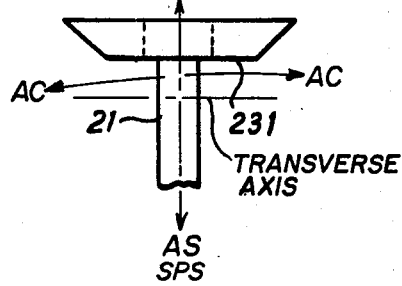

DAMPING APPARATUS FOR DAMPING THE RESONANCE OF DISC RECORD TONE ARMS

BACKGROUND OF THE INVENTION

This invention relates to damping apparatus for damping the resonance of disc record tone arms and of the form comprising first and second relatively movable elements in engagement with energy absorbing material therebetween. Such energy absorbing material may comprise air or viscous fluid. The expression "tone arm" is used herein to comprehend a structure in which a limb carries at one end thereof a cartridge in which is mounted a stylus compliance for engaging the spiral trace of a disc record whilst at its end remote from the cartridge the limb is pivotally mounted for movement with respect to planes parallel with and normal to the disc record.

It has previously been proposed in U.S. Pat. No. 4,131,284 to provide on one of the relatively movable elements of the damping apparatus a skid having a contact area with the record surface and of such rigidity as to inhibit in operation tracking of the record trace by the skid thereby to enable transverse sliding movement of the skid relatively to the record trace.

Whilst these requirements of appropriate rigidity and contact area with the record surface are fundamental to satisfactory operation of the skid, it has now been appreciated that by proper construction and configuration of the skid certain undesirable noises which degrade quality of sound reproduction can be substantially reduced if not eliminated.

SUMMARY OF THE INVENTION

The present invention consists in damping apparatus for damping the resonance of a disc record tone arm and of the form comprising first and second relatively movable elements in engagement with energy absorbing material therebetween, wherein one of said elements has mounted thereon a skid assembly comprising a cantilever arm anchored to said one element and having substantial stiffness both in the direction of the major axis of the catilever arm, in a plane parallel to the second surface and in the plane containing the major axis of the arm normal to the record surface and further having substantial compliance transversely to the lever arm in the plane of the major axis thereof which is parallel to the record surface, and, a skid pad at the free end of the cantilever arm which extends transversely of the cantilever arm and in operation engages the record surface and which has substantial stiffness in the direction tangential to the spiral trace of the record, the cantilever assembly having torsional compliance as to enable a radially inner end of the skid pad on surmounting material projecting slightly from the record surface to exert only a small force at the cantilever arm support.

Preferably, the skid pad is formed with a uniform cross-section parallel with the record surface and includes radially inner and outer sections respectively tapering in the radially inner and outer directions. Advantageously, the uniform cross-section is of trapezium form with the longer parallel side of the section located forwards in the direction of record rotation with respect to the shorter parallel side thereof.

In one form of the invention the relatively movable elements comprise a plunger and a dashpot within which the plunger is slidably engaged, the cantilever arm being secured to said dashpot.

BRIEF DESCRIPTIONS OF THE DRAWINGS

The invention will now be described, by way of example, with reference to the accompanying somewhat diagramatic drawings in which:

FIG. 1 is a side elevation of one form of damping apparatus according to the invention, FIG. 2 is an enlarged fragmentary view of a part of FIG. 1 as seen looking from the left of FIG. 1 illustrating details of the construction, FIG. 3 is a side elevation of the cantilever arm-skid pad assembly used in the embodiment of FIG. 2, FIG. 4 is a side elevation of the cantilever arm used in the embodiment of FIG. 3, FIG. 5 is an end elevation of the cantilever arm of FIG. 4 as seen looking from the left of FIG. 4, FIG. 6 is an end elevation of the skid pad used in the embodiment of FIG. 6, and FIG. 7 is a fragmentary plan view of a cantilever arm-skid pad assembly in accordance with a modified embodiment of the present invention.

In the drawings like parts have been accorded the same reference numerals.

DETAILED DESCRIPTION OF THE PREFERRED EMBODIMENTS

Referring to FIG. 1, a damping apparatus according to the present invention has first and second relatively movable elements 3 and 5 of which element 3 is a plunger and element 5 a cylindrical dashpot within which the plunger is axially movable. The dashpot contains a charge of fluid of high viscosity which acts as an energy absorbing medium. In an alternative form of dashpot the cylindrical element 5 is engaged by a close fitting piston formed with a small aperture for the passage of air into and out of the cylinder, the air providing the energy absorbing medium.

The upper end of the plunger 3 is formed with a screw 9 which is externally threaded and retained in a bushing 10 which is internally threaded and secured in an aperture of a lower horizontal part 12 of a plate 11 which is connected to an upper horizontal part 13 thereof by vertical portion 14. The threads of the bushing 10 and screw 9 afford height adjustment of the plunger 3 enabling the damper to be correctly set for cartridges of different height. To facilitate rotation of the screw 9 by means of a screw-driver from the side of the damper the screw 9 is formed with a cruciform head 8.

The damper is connected in its operative location by unfastening the fixing bolts (not shown) between the stylus cartridge 15 and the metal shell 16 at the end of the tone arm providing a mounting for the cartridge. The upper horizontal part 13 of the plate 11 is located between the cartridge and the metal shell 16 and clamped in that position by the bolts which fix the cartridge to the shell. Suitably, the part 13 is formed with slots (not shown) through which the fixing bolts pass to enable adjustment of the position of the damper relatively to the cartridge stylus tip 17 in the tangential direction with respect to the spiral trace of a record 18 engaged by the stylus tip. The center point of the damper cylinder base is, accordingly, adjusted for location about 1 cm. from the stylus tip.

Mounted on the base of the dashpot 5 is a skid assembly 20 which comprises a cantilever arm 21 secured at a trailing end thereof in a block 22 fixedly mounted on the base of the dashpot 5 and having mounted thereon at its leading end a transversely disposed plate 23 constituting a skid pad located on the radius between the stylus tip and the turntable axis. The skid pad is rectangular in vertical and horizontal cross-section and is made of low friction material, for example PTFE or other fluorocarbon material and has dimensions of 2 mm. in the radial direction by 1 mm. in height and 0.3 mm. thickness. In an upper part of the pad is formed a small hole 25.

The cantilever arm 21 is formed from a circular section nylon (or other plastic) monofilament, 0.25 mm, in diameter and approximately 4 mm. long. Except for a length of 0.5 mm. approximately at the leading end of the cantilever arm by means of which the pad 23 is mounted on the arm with the arm engaging in the hole 25, the arm is flattened, using heated dies, to a section of 0.6 mm. by 0.1 mm. The 0.6 mm. dimension of the section of the cantilever arm is vertically disposed. The pad 23 is cemented on to the circular stub at the leading end of the cantilever arm 21. The block 22 is formed with a vertical slot in which the rear end of the cantilever arm is cemented so that the arm 21 is downwardly inclined from the rear to the front end thereof at an angle of approximately 5° to the under surface of the dashpot 5.

It has been found in practice that to achieve reliable, substantially noise-free operation of the damper device, the resistance to motion required of the skid pad 23 relative to its anchorage on the dashpot 5 has to be very different in three axes at the anchorage, i.e. the longitudinal axis (the axis of the largest dimension), the vertical axis (the axis perpendicular to the longitudinal axis in the plane normal to the record surface, and the transverse axis (the axis perpendicular to both said longitudinal and vertical axes), of the cantilever arm 21 and has further to be different in torsion. The resistance to motion of the skid along these axes and in torsion has to be controlled within close limits. Thus, in operation, the cantilever arm imparts a high degree of stiffness in the direction of the vertical axis and in the direction of the longitudinal axis of the cantilever arm together with a high compliance in the direction of the transverse axis of the cantilever arm. Moreover, the dimensions of the pad 23 ensure that when the leading edge of the pad encounters material projecting slightly above the record surface, the cantilever assembly can twist to allow the pad to ride over the projecting material without any substantial force resulting at the anchorage of the cantilever assembly. In FIGS. 2, 6, and 7, the directions of stiffness and compliance of the arm and the skid pad are shown and marked AS in the case of arm stiffness, AC in the case of arm compliance, TC in the case of torsional compliance, and SPS in the case of skid pad stiffness.

Both imperfections in the record suface and frictional effects of the damper on the record surface may result in excess noise which may be transmitted to the cartridge stylus. The main advantage of the stylus cantilever skid assembly described above is that the various parameters can be adjusted over a wide range and optimized for minimum noise output without sacrificing damping efficiency to any significant extent.

It has been found in practice that the skid pad 23 which has been utilized in the form of a pad of vertical and horizontal rectangular cross section may generate an unacceptable degree of "needle talk" (hereinafter defined) in some cases when first used. Accordingly it may have to be "run in" for an appreciable number of playing hours by the user before an acceptably low level of "needle talk" is achieved.

The excess noise appears to be attributable to two causes. The first of these is roughness or imperfections in the contact surface of the skid, produced when it is cut to size. This can easily be overcome by lapping the contact surface with a fine grit abrasive during manufacture. However, even if this lapping step is carried out, it has been found in some cases that appreciable "needle talk" still takes place. The second cause of this "needle talk" has been established as arising if the major axis of the skid surface is not accurately parallel to the record surface. In such circumstances initial contact with the record only takes place along one edge of the skid parallel to the minor axis thereof. In an extreme case, this may result in line contact between the edge of the skid and a single groove, extending over several wavelengths of recorded sound. This form of contact during playing of the record can result in appreciable "needle talk".

As the wear rate of the skid is very low this situation could persist for many playing hours before an acceptably low level of "needle talk" is achieved. Also, after the skid has been "run in", if it is subsequently misaligned by the user excess noise may again result. The form of skid pad illustrated in FIG. 7 overcomes these problems.

The cantilever arm 21 in all respects corresponds with that illustrated in the other Figures of the drawings. Also, the dimensions of the skid pad 231 are the same except in one important respect as those of the pad 23. The manner in which the pad 231 differs from the pad 23 is that in the case of the pad 231 the opposite ends of the pad are tapered in horizontal cross section. Thus, as shown, the horizontal cross-section of the pad is in the form of a trapezium of maximum base dimension 2 mm. and thickness 0.3 mm. The angle of taper from the 2 mm. base to the side of the pad parallel therewith is preferably in the range 30°–40°.

The skid pad as will be appreciated is attached to the cantilever so that the 2 mm. base of the trapezium section of the skid is located forwardly in the direction of record rotation with respect to the side of the skid parallel with the 2 mm. base thereof.

With this arrangement, if the contact surface of the skid is not parallel to the record surface, contact with first take place at the apex of the angle of taper at one or other end of the skid. This is initially, virtually a point contact which appears to generate a negligible amount of "needle talk" which is barely if at all detectable under any normal listening conditions.

Thus with this arrangement, the skid contact is quiet from the start even if there is an appreciable measure of misalignment. Accordingly no lengthy "running in" routine is necessary.

The performance of the cantilever skid assembly described in relation to FIGS. 1 to 6 or as modified in accordance with FIG. 7 will now be discussed in relation to various noise sources on records encountered during operation:

1. "Needle-talk".

This is caused by partial lateral tracking of the tops of the modulations of the spiral trace by the skid pad. The resulting elastic deformation of the groove is transmitted to the cartridge stylus mainly through the material of the record. By making the major dimension of the skid large enough to span several grooves and providing it with a smooth, flat, hard surface the major axis of which is accurately parallel to the record surface, tracking due to irregularities in the skid pad contact surface is substantially eliminated and "needle-talk" is not apparent. In the case of the arrangement of FIG. 7, "needle talk" arising from the contact surface of the skid pad making line contact with the record trace is substantially reduced by virtue of the tapered section of the pad.

2. "Run-out noise."

This stems from two different causes:

(a) Run-out scroll imperfections. The scroll on some records has a raised projection on either side of the groove. If the skid is rigidly attached to the damper body, when it encounters this projection, it is subjected to an increasing side force until it suddenly jumps the projection. This side force tends to twist the whole headshell + cartridge assembly, and when suddenly relieved, impulse noise results. With the skid assembly design described, due to its configuration, the cantilever arm has a very high compliance ($60 \times 10^{-6}$ cm/dyne) in the lateral plane, also the skid assembly has a very flow torsional moment, due to the long lever arm provided by the major dimension of the skid pad. Thus the skid pad assembly is substantially decoupled from the dashpot 5 and the scroll impulse noise (if any) is inaudible.

(b) Matrix number noise. A small proportion of records have a badly stamped matrix number, with material thrown up above the record surface. The same sort of considerations as outlined in (a) above apply here also, and in most cases matrix number noise is undetectable.

3. Label noise.

Labels on some makes of record have a rough surface. These produce very small amplitude, high velocity vertical displacements of the system. If the skid pad is rigidly attached to the damper body, this can produce quite a lot of impulse noise. This, in fact, only occurs during the run out as the damper is clear of the label whilst music is being played.

Label noise has been reduced to a very low level by introducing a very small, controlled amount of compliance, i.e. reduced stiffness vertically by means of the cantilever which by virtue of its configuration is very stiff in the vertical direction (Compliance = $1.4 \times 10^{-6}$ cm/dyne).

Vertical compliance must obviously result in reduced damping efficiency. In the case of the new cantilever skid assembly, the "lost motion" resulting from the vertical compliance for maximum vertical warp velocity of 0.2 cm/sec is of the order of 6 microns which is negligible—about 2.5% of the static deflection of the average cartridge stylus.

4. "Stick slip" noise.

This may be generated by many plastics, even PTFE, in sliding friction contact with the record surface under certain conditions. It takes the form of a relaxation oscillation of the skid in the tangential direction. It is transmitted through the record material to the cartridge stylus and depending on the geometry of the skid pad becomes audible as a low level buzzing or moaning sound or as a higher pitched note. It has been found that if the skid is compliant and thick in the tangential direction there is considerable likelihood of it producing "stick slip" noise on a proportion of records and especially when tracking the shiny run-out section.

By virtue of its geometry, the new assembly is very stiff and only 0.3 mm. thick in the axial (tangential) direction (with respect to the stylus) and no "stick slip" has been detected with this system.

The general features of the damper 1 are described in detail in U.S. Pat. No. 4,131,284. In that patent a further embodiment is described with respect to FIG. 5 of the drawings forming part of that patent. To those skilled in the art it will be apparent that the cantilever assembly described above with appropriate changes in dimensions can be employed to replace the elements 42, 43, 44 and 45 of the further embodiment of FIG. 5 of U.S. Pat. No. 4,131,284.

I claim:

1. In a damping apparatus for damping the resonance of a disc record tone arm, comprising first and second relatively movable elements in engagement with energy absorbing material therebetween, and skid means mounted on one of said elements for engagement, when in use, with the disc record surface, the improvement wherein said skid means comprises:

a cantilever arm anchored at one end thereof to said one element and having a longitudinal axis, wherein said cantilever arm has substantial stiffness both in the direction of the longitudinal axis thereof and in the plane, containing the longitudinal axis of said cantilever arm, normal to the record surface when in use, and further wherein said cantilever arm has substantial compliance transversely to said cantilever arm in the plane, containing the longitudinal axis thereof, parallel to the record surface when in use; and a skid pad connected to said cantilever arm at the end thereof opposite that end anchored to said one element, said skid pad having a first axis which extends transversely of the longitudinal axis of said cantilever arm, wherein said skid pad has substantial stiffness in the direction normal to the first axis thereof in the plane parallel to the surface of the record when in use, wherein said skid means has torsional compliance sufficient to enable one end of the longitudinal dimension of said skid pad to surmount material projecting slightly above the record surface while exerting only a small force at the point of anchoring of said cantilever arm to said one element.

2. Damping apparatus as claimed in claim 12, wherein said skid pad comprises a plate of substantially greater dimension along the first axis thereof than along the axis perpendicular thereto and parallel to the record surface when in use.

3. Damping apparatus as claimed in claim 2, wherein the dimension of said skid pad along the first axis thereof is approximately twice the dimension thereof in the plane normal to the record surface when in use and approximately seven times the dimension of said skid pad along the axis perpendicular to the first axis thereof and parallel to the record surface when in use.

4. Damping apparatus as claimed in claim 2 or claim 3, wherein said skid pad tapers towards the ends thereof in the dimension of said first axis.

5. Damping apparatus as claimed in claim 4, wherein said skid pad is formed with a uniform cross section parallel with the record surface.

6. Damping apparatus as claimed in claim 5, wherein said uniform cross-section is of trapezium form with the longer parallel side of the section located forwards in the direction of record rotation with respect to the shorter parallel side thereof when in use.

7. Damping apparatus as claimed in claim 1 wherein the skid pad is formed from PTFE or other fluorocarbon material.

8. Damping apparatus as claimed in claim 1 wherein said cantilever arm comprises a monofilament approximately 4 mm. in length and flattened to a section which in the plane normal to the record surface is approximately six times the transverse dimension of said cantilever arm in the plane parallel to the record surface.

9. Damping apparatus as claimed in claim 8, wherein said cantilever arm is unflattened at an end thereof adjacent said skid pad where it is secured relatively to said skid pad by engagement as a close fit within a hole formed in said skid pad remotely from the surface of said skid pad which engages the record surface.

10. Damping apparatus as claimed in claim 8 wherein said cantilever arm is anchored to the associated element of the damping apparatus as to incline slightly downward towards the record surface in the direction of said skid pad when in use.

11. Damping apparatus as claimed in claim 1, wherein said relatively movable elements comprise a plunger and a dashpot within which the plunger is slidably engaged, said cantilever arm being secured to said dashpot.

* * * * *